US005317743A

United States Patent [19]

Imai et al.

[11] Patent Number: 5,317,743

[45] Date of Patent: May 31, 1994

[54] SYSTEM FOR COMPILING ITERATED LOOPS BASED ON THE POSSIBILITY OF PARALLEL EXECUTION

[75] Inventors: Toru Imai; Kenji Sirakawa, both of Kanagawa, Japan

[73] Assignee: Kabushiki Kaisha Toshiba, Tokyo, Japan

[21] Appl. No.: 731,063

[22] Filed: Jul. 17, 1991

[30] Foreign Application Priority Data

Jul. 18, 1990 [JP] Japan .................................. 2-188138

[51] Int. Cl.[5] .................................................. G06F 9/30

[52] U.S. Cl. .................................... 395/700; 395/375; 364/261.3; 364/263; 364/DIG. 1

[58] Field of Search ........................ 395/700, 375, 650

[56] References Cited

U.S. PATENT DOCUMENTS

| | | | |
|---|---|---|---|
| 4,710,872 | 12/1987 | Scarborough | 395/700 |
| 4,807,126 | 2/1989 | Goton | 395/700 |
| 4,833,606 | 5/1989 | Iwasawa | 395/700 |
| 5,067,068 | 11/1991 | Iwasawa | 395/650 |
| 5,088,034 | 2/1992 | Ihara | 395/700 |
| 5,109,331 | 4/1992 | Ishida | 395/700 |

OTHER PUBLICATIONS

David A. Padua and Michael J. Wolfe, "Advanced Compiler Optimizations for Supercomputers", Dec. 1986, Commun. of the ACM, vol. 29, No. 12.

J. Gazdag & H.-H. Wang, "Concurrent Computing by Sequential Staging of Tasks," IBM Systems Journal, vol. 28, No. 4, 1989, pp. 646-660.

*Primary Examiner*—Thomas C. Lee
*Assistant Examiner*—Jennifer M. Orzech
*Attorney, Agent, or Firm*—Finnegan, Henderson, Farabow, Garrett & Dunner

[57] ABSTRACT

A compiler apparatus in a computer converts source program to object program to be executed by the computer. If loop instructions are included in the object program, the resource reference extraction section extracts resources referred by the loop instructions and the resource change extraction section extracts resources changed by the loop instructions. The loop parallel decision section decides possibility of parallel execution for different stages of the loop instructions according to the extraction result. The code generation section generates object instructions which are parallely executed if the loop parallel decision section decides that the loop instructions can be parallely executed, generates object instructions which are not parallely executed if the loop parallel decision section decides that the loop instructions cannot be parallely executed, and generates object instructions which branches parallel execution instructions or non-parallel execution instructions according to condition to parallely execute at execution mode if the loop parallel decision section cannot decide whether the loop instructions can be parallely executed or not.

10 Claims, 13 Drawing Sheets

```
for i : = 1  to  100  do                    (1)
 A [ p + i ]  : =  A [ q + i ] + B;         (2)
```

FIG. 1

| | ITERATIONS | | |
|---|---|---|---|
| | ( i - TIMES ) | ( ( i + 1 ) - TIMES ) | ( ( i + 1 ) + 1 - TIMES ) |
| TIME | | | |
| (1) | load A [ q + 1 ] | | |
| (2) | add B | load A [ q + 2 ] | |
| (3) | store A [ p + 1 ] | add B | load . . |
| (4) | | store A [ p + 2] | add |
| . . . | | | store . . |

FIG. 2

```
char   *p , *q , *r ;
{
for  (i = 0 ; i ++ ; i<100)
*p++=*q++ +*r++;
}
```

FIG. 5

Figures 6, 7, 8:
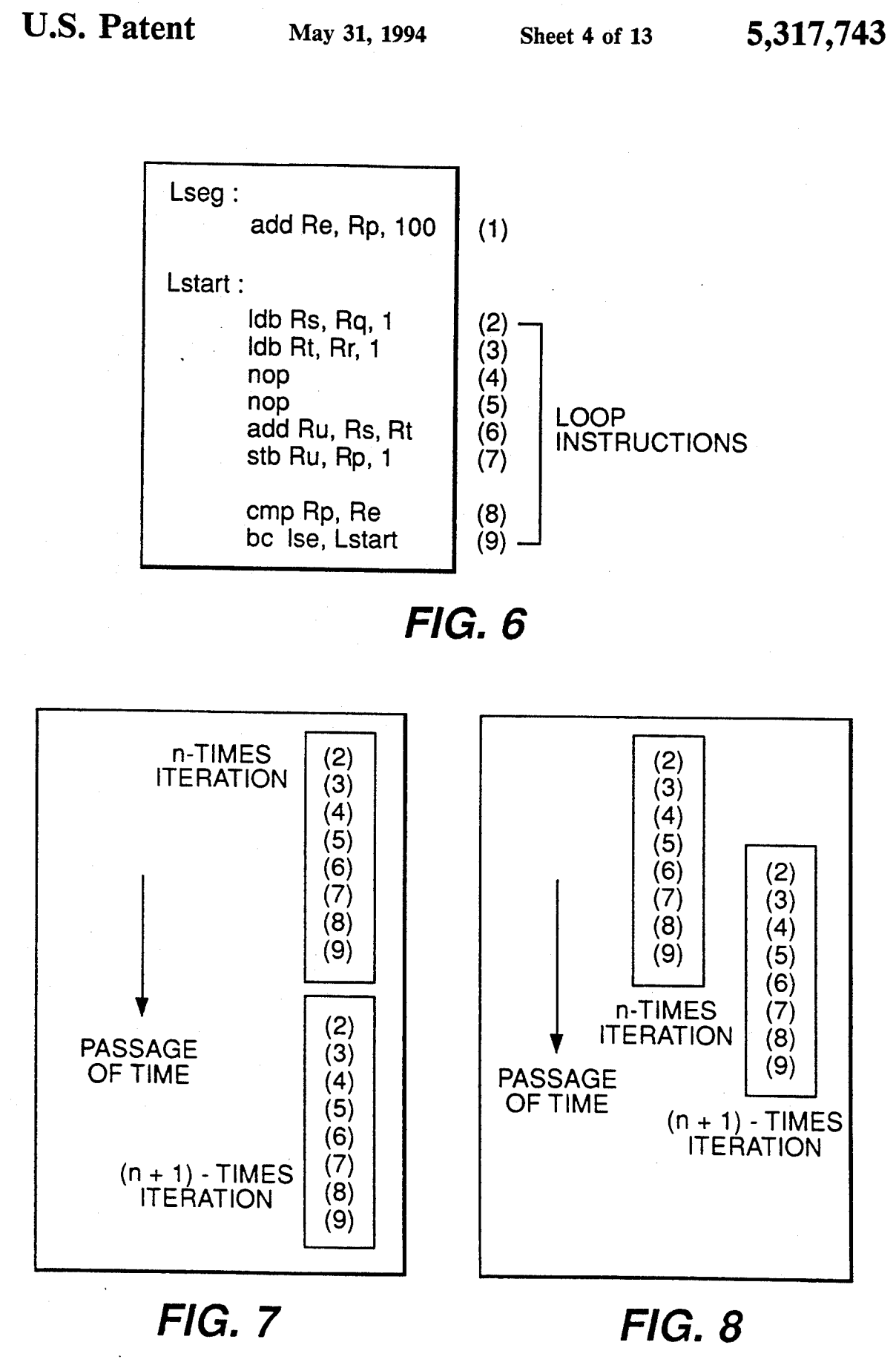

```
Lseg :
        add Re, Rp, 100      (1)

Lstart :
        ldb Rs, Rq, 1        (2)
        ldb Rt, Rr, 1        (3)
        nop                  (4)
        nop                  (5)
        add Ru, Rs, Rt       (6)
        stb Ru, Rp, 1        (7)

        cmp Rp, Re           (8)
        bc  lse, Lstart      (9)
```

LOOP INSTRUCTIONS

FIG. 6 n-TIMES ITERATION (2) (3) (4) (5) (6) (7) (8) (9)

PASSAGE OF TIME (n + 1) - TIMES ITERATION (2) (3) (4) (5) (6) (7) (8) (9)

n-TIMES ITERATION (2) (3) (4) (5) (6) (7) (8) (9)

PASSAGE OF TIME (n + 1) - TIMES ITERATION

| REFERENCE INSTRUCTION | REFERENCE REGISTER | REFERENCE MEMORY ADDRESS |
|---|---|---|
| (2) | — | _q + n |
| (3) | — | _r + n |
| (6) | Rs, Rt | — |
| (7) | Ru | — |
| (8) | Rp | — |

110

| CHANGE INSTRUCTION | CHANGE REGISTER | CHANGE MEMORY ADDRESS |
|---|---|---|
| (2) | Rs | — |
| (3) | Rt | — |
| (6) | Ru | — |
| (7) | — | _p + n |

200

| (n+1)-TIMES \ n-TIMES | (2) | (3) | (4) | (5) | (6) | (7) | (8) | (9) |
|---|---|---|---|---|---|---|---|---|
| (2) | | | | | △ | ○ | ○ | ○ |
| (3) | | | | | | △ | ○ | ○ |
| (4) | | | | | | | △ | ○ |
| (5) | | | | | | | | △ |
| (6) | | | | | | | | |
| (7) | | | | | | | | |
| (8) | | | | | | | | |
| (9) | | | | | | | | |

FIG. 14

| n-TIMES | COMPETITIVE RESOURCE | (n+1)-TIMES | COMPETITIVE RESOURCE |
|---|---|---|---|
| (7) | p + n | (2) | q+(n+1) |
| (7) | p + n | (3) | r+(n+1) |

FIG. 15

```
cmp  Rp, Rq+1 ---------------- (10)
bc   eq, Lseq ---------------- (11)

cmp  Rp, Rr+1 ---------------- (12)
bc   eq, Lseq ---------------- (13)
```

```
Lparallel:
        add   Re, Rp, 100
        ldb   Rs, Rq, 1
        ldb   Rt, Rr, 1
        nop
        nop
Lstart:
        add   Ru, Rs, Rt        ldb  Rs, Rq, 1
        stb   Ru, Rp, 1         ldb  Rt, Rq, 1
        cmp   Rp, Re            nop
        bc    lse, Lstart       nop
```

```
        b:exit
```

```
Lseq:
        add   Re, Rp, 100
Lstart:
        ldb   Rs, Rq, 1
        ldb   Rt, Rr, 1
        nop
        nop
        add   Ru, Rs, Rt
        stb   Ru, Rp, 1

        cmp   Rp, Re
        bc    lse, Lstart
```

```
exit  :
```

*FIG. 18*

SYSTEM FOR COMPILING ITERATED LOOPS BASED ON THE POSSIBILITY OF PARALLEL EXECUTION

BACKGROUND OF THE INVENTION

A. Field of the Invention

The present invention relates to a method and apparatus for compiling loops of instructions of computer programs and for executing the compiled loops in a data processing system.

B. Discussion of the Related Art

A compiler of a data processing system (e.g., microcomputers) typically converts source code of computer programs to object code. Source code is easily understandable by computer programmers and is generally written in a high level computer programming language, e.g., C, PASCAL, or BASIC. Object code, on the other hand, is represented by strings of binary numbers, e.g., 0101 or 1010, and is capable of being understood by the data processing system which executes the computer programs. There is also a computer programming language that is commonly referred to as assembly language, which is considered a low level programming language. Assembly language is also considered the closest programming language to object code and is understandable by computer programmers.

One line of source code of a computer program (and the corresponding line of object code) instructs the data processing system to perform one or more operation(s) or function(s), e.g., read data from memory and store the read data in variable VAR. An ordered set of one or more lines of source code (or object code) may be referred to as a loop of instructions. Loops are used to execute repeatedly a set of one or more instructions by a data processing system until a particular condition(s) is/are true. Typically, the condition appears in the line of source code which signifies the beginning or the end of the loop.

The instructions included in a loop are executed n-times (or n iterations) until a predetermined condition is satisfied. For example, in an iterative loop, a loop of instructions will be executed a specified number of times, e.g. 100 times. During the n-times iteration of an iterative loop, e.g., the second iteration, if the condition is not satisfied (e.g., the loop has not been executed 100 times), then the next iteration, or the (n+1)-times iteration of the loop, e.g., the third iteration, is executed.

Other loops, e.g., do-while loops, execute the set of instructions until a condition (e.g., X is not equal to 1) is satisfied. In this type of loop, the data processing system also checks to determine whether the condition to escape (or end) the execution of the loop is satisfied after each iteration.

Recently, vector methods have been applied to attempt to execute loops quickly and efficiently using data processing systems that contain multiple microprocessors. Using one such vector method, one microprocessor executes the n-times iteration of a loop and, before completing the n-times iteration, a second microprocessor begins executing the next iteration, or (n+1)-times iteration, of the loop. In other words, instructions from different iterations (n-times and (n+1)-times) of a loop can be executed at the same time using data processing systems including a plurality of microprocessors.

Using this vector method, however, one or more instructions of an iteration of a loop may not be executed according to the order for the complete loop execution set up by the computer programmer. Accordingly, if the intended order of execution is disturbed, and the loop contains multiple instructions which refer to and alter the same variable (or register or the same memory address), the result of executing the loop will differ from the originally intended result.

For example, one of ordinary skill will recognize that FIG. 1 illustrates source code for an iterative loop of a computer program written in the FORTRAN programming language. This is exemplified by the first line of source code, the instruction for i:=1 to 100 do (1). According to this instruction, the data processing system will execute the successive instruction(s) a total of 100 times. When the loop of FIG. 1 begins executing in a data processing system, "i" is set to 1 (or i=1). Thereafter, during each successive iteration of the loop of FIG. 1, i is set equal to the previous value for i plus 1 (or i=i+1). For example, during the first iteration of the loop i=1 and during the second iteration i=2.

In FIG. 1, the only successive instruction is $$A[p+i]:=A[q+i]+B; \quad (2).$$

In general, this instruction sets the value of one entry (or element) in an array to the value of another entry in the array plus the value of the variable B. In this instruction, "A" represents the name of an array. An array is a collection of data that is given one name, in this case "A". Each element can be identified by a number, commonly referred to as a subscript, which indicates the row, and in some cases column, in which the element is located. In the example of FIG. 1, the first element in the array A is referred to by "A[0]" and the second "A[1]" and so forth.

Also included in the instruction (2) of FIG. 1 are the variables "i" which is incremented during execution of the loop, "p","q", and "B". Variables "p" and "q" and "B" may be initialized or set to be equal to specific numbers prior to the execution of the loop of FIG. 1. Changing the value of i with each iteration of the loop, as discussed above, necessarily affects the results of the execution of each iteration because the value of i impacts which element of the array A will be set equal to which other element of array A plus the value of B.

For example, if all entries in array A are set to 10, that is A[0]=10, A[1]=10 and so forth, and if p is initialized to −1 (or p=−1), q is initialized to 0 (or q=0), and B is initialized to 10 (or B=10), then after the first iteration A[0]=20 (or A[0]:=A[1]+B which is the same as A[0]:=10+10). After the second iteration A[1] will also equal 20 (or A[1]:=A[2]+B which is the same as A[1]:=10 +10). In each successive iteration of the loop, the next element of array A will be set equal to 20.

FIG. 2 illustrates an example of the parallel execution of multiple iterations of the loop of instructions illustrated in FIG. 1. In FIG. 2, however, instruction (2) of FIG. 1 is separated into 3 steps, for example: load A[q+1], add B, and store A[p+1]. These three steps assume the existence of a single register, for example, R1, in which to manipulate (load and add) the values of elements in the array A, and the steps are similar to the assembly language level instructions corresponding to instruction (2) of FIG. 1. Therefore, the first step "load A[q+1]" is equivalent to "load the contents of element A[q+1] into the register R1," the second step "add B" is the same as "add the value of variable B to the contents of register R1," and the third step "store A[p+1]"

is the same as "store the contents of register R1 in element A[p+1] of array A."

In FIG. 2 the set of instructions for each iteration of the loop, e.g., iteration (i-times), iteration ((i+1)-times), and iteration (((i+1)+1)-times), is separated into three columns to represent the steps of each iteration being executed by one of multiple microprocessors in a data processing system. The left column of FIG. 2 represents time periods. In other words, during time period (2), for example, microprocessor 1, which executes the (i-times) iteration (where i=1), performs the add step (or adds the value of B to A[q+1]) simultaneously with microprocessor 2, which executes the (i+1)-times iteration, performing the load A[q+2] operation.

In FIG. 2, before the "store" instruction of (i-times) iteration of the loop is executed in microprocessor 1, during time (3), the "load" instruction of time (2) of the (i+1)-times iteration of the loop is executed in microprocessor 2. If the variable "p" is equal to the value of the variable q plus 1 (or p=q+1), the "load" step of the (i+1)-times iteration of the loop must be executed, for example, in time (4), after the "store" step of the (i-times) iteration because the "load" step of the (i+1)-times iteration depends upon the result of the "store" step of the (i-times) iteration. Otherwise, the intended result of the loop of instructions would be altered by this vector method. For example, if p=q+1, and both p and q are initialized to 1 (or p=1 and q=1), then in time interval (3) of the (i-times) iteration of the loop, the "store" step will store the contents of register R1 in A[3] and while, in time interval (2) of the (i+1)-times iteration of the loop, step (2) requests that the contents of A[3] be loaded into the register R1 for use during the (i+1)-times iteration of the loop. Therefore, if p=q+1, the loop consisting of the three steps of FIG. 2 cannot be parallely executed by multiple microprocessors.

To solve this problem, those skilled in the art have attempted to determine, before executing the program, whether multiple instructions of a loop refer to and alter the same variable (or register or address in memory) before attempting parallel execution. The compiler of the data processing system has generally been used to make this determination while compiling the source code into object code. Using conventional methods, the compiler decides which steps of a loop can be parallely executed by attempting to identify steps of the loop which refer to the same register or variable If the execution order of the instructions of a loop is to be changed to accommodate parallel processing, the compiler of the data processing system generally generates object cod instructions indicating which steps can be parallely executed. If the execution order of the instructions of the loop cannot be changed, the compiler generates loop instructions indicating which steps cannot be parallely executed.

Using this method, however, it is not possible to always determine which resource (register or variable) is referred to or changed by each instruction of a loop during the compiling procedure. Often, identifying which resources are referenced by an instruction of a loop can only be determined during the execution of the loop. For example, in the loop of instructions shown in FIG. 2, the values of variables p and q are determined by source code instructions which precede the loop and these source code instructions are executed before the execution of the loop. Therefore, the value of each of the variables p and q is not determined during the compiling of the source code of the loop, but is determined during the execution of the program. In this example, using the conventional method discussed above, the compiler will generate a loop of instructions which are not parallely executed to assure correct execution order. Therefore, even if instructions of the loop of instructions may be parallely executed, the loop of instructions are executed sequentially (non-parallel execution). As a result, execution time increases in these situations and the resources of the multiple microprocessors is also wasted.

SUMMARY OF THE INVENTION

The present invention has been made in view of the above circumstances and has an object to provide a compiler method and apparatus in a data processing system, which allows for a loop of instructions to be parallely executed if it is determined that the loop of instructions is able to be parallely executed at execution time.

Additional objects and advantages of the invention will be set forth in part in the description which follows and in part will be obvious form the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the present invention is comprised of a loop compiler in a data processing system which includes a plurality of processors, each capable of executing object programs The loop compiler compiles an object program consisting of a plurality of instructions to be executed by the data processing system. A loop consist of a plurality of instructions to be executed a plurality of iterations by a one of the plurality of processors. The loop compiler comprises a loop instructions extraction means for extracting a loop from the plurality of instructions; a resource reference extraction means for extracting resources read by at least one of the instructions in the extracted loop; a resource change extraction means for extracting resources changed by at least one of the instructions in the extracted loop; a loop parallel decision means for determining, in accordance with the extracted resources extracted by the resource reference extraction means and the resource change extraction means, whether a first iteration and a second iteration of the loop can be parallely executed; and a code generation means for generating, in accordance with the determination of the loop parallel decision means, object instructions, including a plurality of types of object instructions for the object program including a first type wherein the object instructions are parallely executed by the plurality of processors, a second type wherein the object instructions are executed by a one of the plurality of processors, and a third type wherein the object instructions include branch parallel execution instructions, non-parallel execution instructions and parallel execution instructions, wherein the branch parallel execution instructions are used, during execution of the object program, to determine whether the non-parallel execution instructions are to be executed by a one of the parallel processors or the parallel execution instructions is to be executed by the plurality of processors.

BRIEF DESCRIPTION OF DRAWINGS

The accompanying drawings, which are incorporated in and constitute a part of this specification illustrate an embodiment of the invention and, together with the description, serve to explain the objects, advantages and principles of the invention. In the drawings, FIG. 1 illustrates an iterative loop of instructions written in source code;

FIG. 2 illustrates an assembly language level loop of instructions corresponding to the loop of FIG. 1 and illustrates the steps of the loop parallely executed by multiple microprocessors;

FIG. 5 illustrates an example of a loop of instructions written in a high level programming language;

FIG. 6 illustrates the assembly language level instructions corresponding to the loop of FIG. 5;

FIG. 7 illustrates an example of sequential execution of two iterations (n and n+1) of the loop of FIG. 5;

FIG. 8 illustrates an example of the parallel execution of two iterations (n and n+1) of the loop of FIG. 5;

FIG. 14 illustrates an instruction order change table created by the loop parallel decision section of the preferred implementation;

FIG. 15 illustrates a decision table identifying the instructions of two sequential iterations (n and n+1) of the loop of instructions shown in FIG. 5 where a change in the execution sequence of the iterations of the loop will create a problem and identifying the competitive resources;

FIG. 18 illustrates an example of the assembly language instructions corresponding to the object code instructions generated by the code generation section of the preferred implementation for the loop of FIG. 5.

DESCRIPTION OF THE PREFERRED IMPLEMENTATION

Reference will now be made in detail to the preferred implementation of the invention as illustrated in the accompanying drawings.

This invention is preferably implemented by a microcomputer or other data processing system. Such a data processing system may be conventional. The preferred implementation is disclosed hereinafter in functional schematic form. To understand the present invention, and in view of the fact that object code is difficult to read and understand, all object code will be illustrated using corresponding assembly language level pseudo code.

Figure 3:
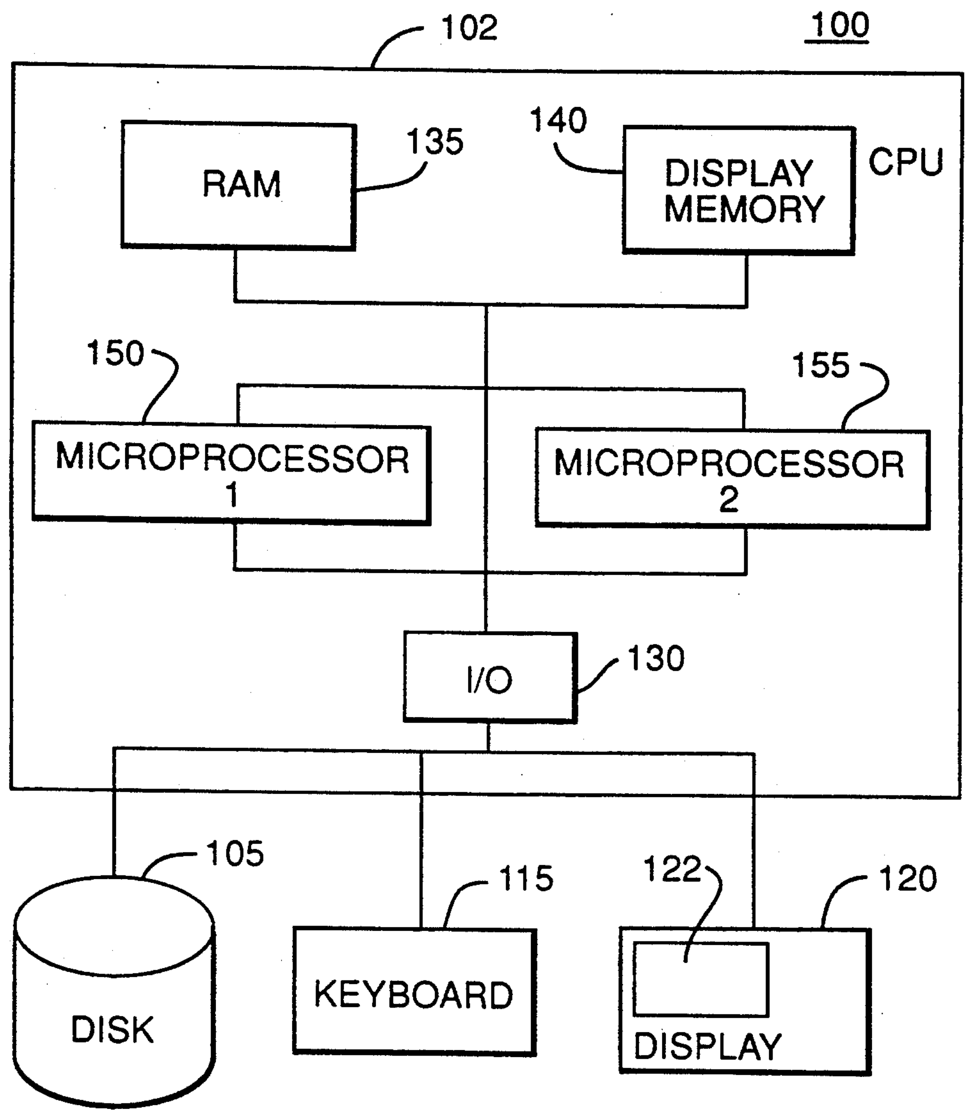
FIG. 3 illustrates an example of a data processing system capable of being used by the preferred implementation.

Referring to FIG. 3, the computer system or platform 100 is comprised of a central processing unit (or CPU) 102, a disk drive 105, a keyboard 115, and a display 120. The platform 100 may also optionally include other external devices (not shown), such as a videodisc system or an electronic instrument system.

The CPU 102 is comprised of an input/output unit 130, a random access memory unit (or RAM) 135, a display memory unit 140, and two microprocessors 150 and 155, respectively. These units are all well known and operate under control of the system software to process various inputs and provide the outputs necessary to generate desired textual and graphic display information on the display screen 122 of the display 120 or other output unit (not shown).

Display memory 140 is a specialized section of RAM which is used to store bit patterns (pixel data) which are read out in an appropriate synchronization with the display beam of the display 120 in order to provide the desired display graphics and text.

The disk drive 105 is also conventional and is provided to permit the ready interchange of control and application software and to provide a source of mass storage for the computer system.

As is generally the case with conventional data processing systems, the keyboard 115 of the computer system 100 of the preferred implementation of the present invention acts as a means of inputting textual or alphanumeric information into the CPU 102. As stated above, the display 120 is comprised of a display screen 122 for displaying the graphic and alphanumeric information output from the CPU 102.

The system 100 also includes a compiler which may be a part of the RAM 135 or stored in the Disk 105. The compiler generally interprets or translates input source code computer programs (written, for example, in the FORTRAN programming language) into object code. These conversion processes are generally conventional and will not be explained However, the operations of the preferred implementation which compiles loops of instructions, and forms a part of the compiler, will be explained.

Figure 4:
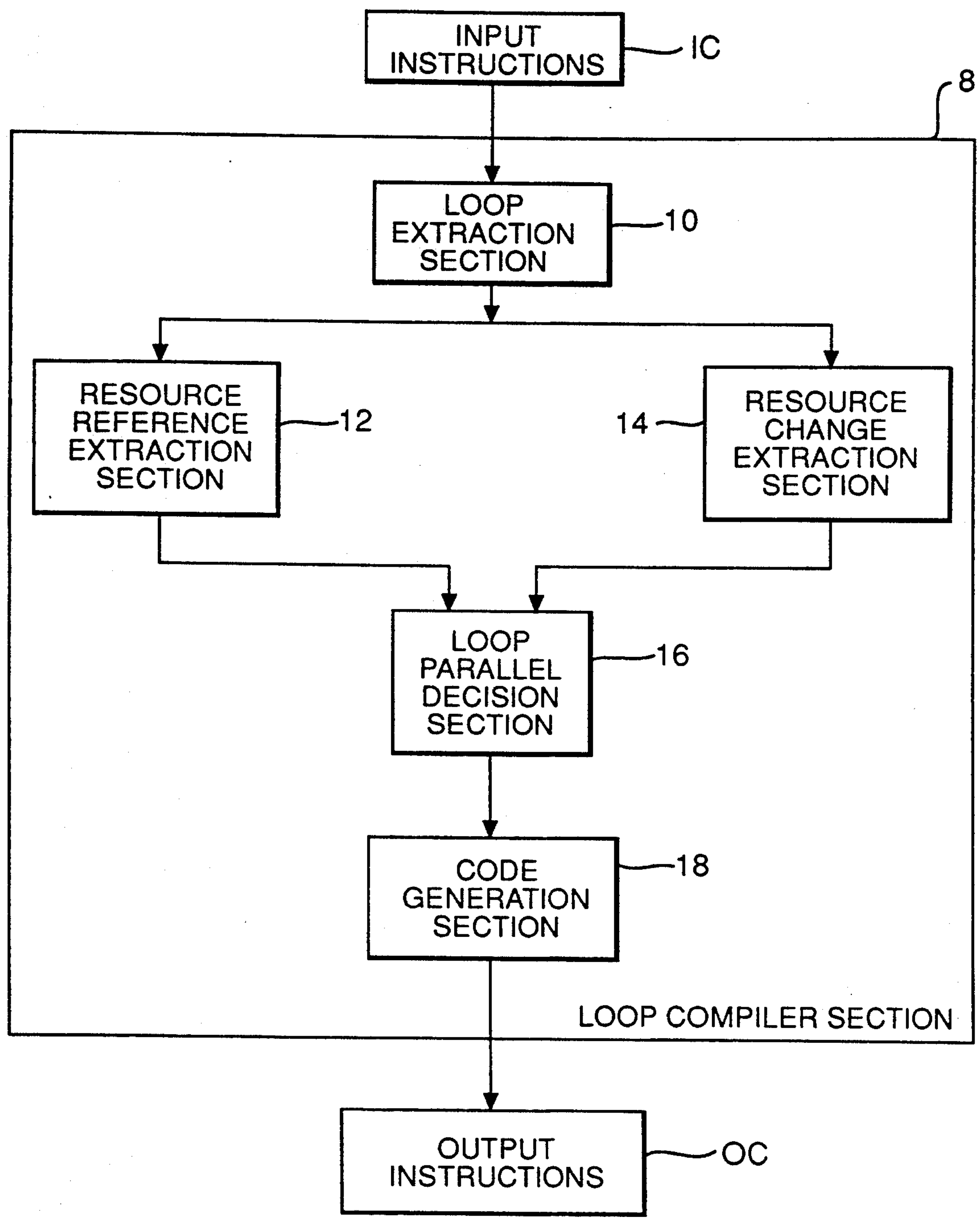
FIG. 4 is a block diagram of a loop compiler according to the preferred implementation of the present invention.

FIG. 4 illustrates a block diagram of the preferred implementation of the present invention. In the preferred implementation, the loop compiler section 8 forms a part of the compiler which may be a part of the RAM 135 or stored in the Disk 105. The loop compiler section 8 is the section of a compiler which processes loops of instructions in object code to determine whether iterations of the loops can be parallely executed by multiple processors. The loop compiler section 8 includes a loop extraction section 10, a resource reference extraction section 12, a resource change extraction section 14, a loop parallel decision section 16, and a code generation section 18.

The loop extraction section 10 extracts loops from input instructions IC which were previously converted from source code to object code by a different section of the compiler.

The resource reference extraction section 12 then identifies any resources referenced (or read) in each of the instructions of the loop from IC and generates a table listing these resources. Resources include registers, memory addresses, data stored in registers, or data stored in memory addresses.

Simultaneous with the operation of the resource reference extraction section 12, the resource change extraction section 14 identifies resources changed (or written) in the loop from IC and generates a table of these resources.

The loop parallel decision section 16 then determines whether the n-times iteration and the (n+1)-times iteration of the loop from IC can be parallely executed, according to the tables generated by the resource reference extraction section 12 and the resource change extraction section 14, respectively. The code generation section 18 generates the appropriate object code instructions to be output, OC. The OC may be parallel execution instructions or non-parallel execution instructions, or both, according to decision result of the loop parallel decision section 16.

FIG. 5 is an example of source code for a loop of instructions written in a high level computer programming language. The source code (loop) shown in FIG. 5 will be used to explain the operations of the loop compiler section 8 of FIG. 4. The loop of instructions in FIG. 5 generally instructs the system 100 to read the 1-byte data corresponding to (or stored in) the memory address associated with variables q and r from memory and to write the sum of these data in the memory address associated with variable p.

FIG. 6 illustrates the assembly language level pseudo code corresponding to the object code generated by a compiler for the source code of FIG. 5. As explained above, since assembly language level code can be easily understood, the operations of the present invention will be described using assembly language examples rather than the more difficult object code. In the assembly language code of FIG. 6, it is assumed that the memory address corresponding to variables "p, q, r" are already loaded into registers "Rp, Rq, Rr," respectively. "Lseg:" and "Lstart" of FIG. 6 are called labels and are used to identify a line in the assembly language code.

According to instruction (1) of FIG. 6, 100 is added to the memory address in (or contents of) register "Rp" and the result is then stored in register "Re". In instruction (2), the 1-byte data which is the contents of register "Rq" is read from memory and loaded into register "Rs" and 1 is then added to the contents of register "Rq". Then, according to instruction (3), the 1-byte data which is the contents of register "Rr" is read from memory and loaded into register "Rt" and 1 is then added to the contents of register "Rr". The instruction "nop" of instructions (4) and (5) indicates a no operation instruction. When the processing of the loop illustrated by the assembly language level code of FIG. 6 reaches instructions (4) and (5), no operation is performed.

According to instruction (6) of FIG. 6, the memory address (or data) stored in register "Rs" is added to the memory address stored in "Rt" and the result is stored in register "Ru". In instruction (7), the memory address stored in register "Ru" is written in register "Rp" and 1 is then added to the contents of register "Rp" Then, in instruction (8), the contents of register "Rp" is compared with the contents of register "Re", and if the contents of register "Rp" is smaller than the contents of register "Re", instruction (9) instructs a branch to instruction (2), or the line following the line labeled "Lstart", to continue processing. If the contents of register "Rp" is not smaller than the value of the memory address in register "Re", the instruction following instruction (9) is executed. The continuous instructions from (2) to (9) or branching between instructions (2) and (9) represent a loop of instructions corresponding to the source code loop of FIG. 5.

The loop of FIG. 6 will now be used to illustrate examples of sequential processing of instructions (2)-(9) by, for example, the single microprocessor 1 150 of FIG. 3 and the parallel processing of instructions (2)-(9) by, for example, both microprocessors 150 and 155 of FIG. 3.

FIG. 7 illustrates the sequential execution of instructions (2)-(9) of FIG. 6. If the loop of instructions represented by instructions (2)-(9) are executed sequentially, then (n+1)-times iteration of the loop is executed after the n-times iteration is completed as illustrated in FIG. 7. FIG. 8, however, illustrates the parallel execution of the loop represented by instructions (2)-(9) of FIG. 6. In FIG. 8, both microprocessors 150 and 155 of FIG. 3 are operating and, each microprocessor processes a different iteration of the loop, instructions (2)-(9).

In the example of FIG. 8, after the instructions (2)-(5) in the n-times iteration of the loop are executed, instruction (6) in the n-times iteration of the loop is executed by microprocessor 1 150, while instruction (2) of the (n+1)-times iteration is executed simultaneously by microprocessor 2 155 of FIG. 3. Likewise, instruction (7) of the n-times iteration of the loop is executed by microprocessor 1 150, while instruction (3) of the (n+1)-times iteration of is executed simultaneously by microprocessor 2 155 of FIG. 3. FIG. 8 also illustrates this same simultaneous sequential execution of instruction (8) of the n-times iteration and instruction (4) of the (n+1)-times iteration, and instruction (9) of the n-times iteration and instruction (5) of the (n+1)-times iteration. Therefore, the instructions (2)-(9) are not executed according to the originally programmed order. For example, instruction (2) of the (n+1)-times iteration is executed before instruction (7) of the n-times iteration.

The resource reference extraction section 12 and the resource change extraction section 14 of the preferred implementation are used to help determine whether a change in the order of executing the loop will effect the results of the loop. For example, the sections 12 and 14 help determine whether executing instruction (2) of the (n+1)-times iteration before instruction (7) of the n-times iteration will effect the results.

Figures 9, 10:
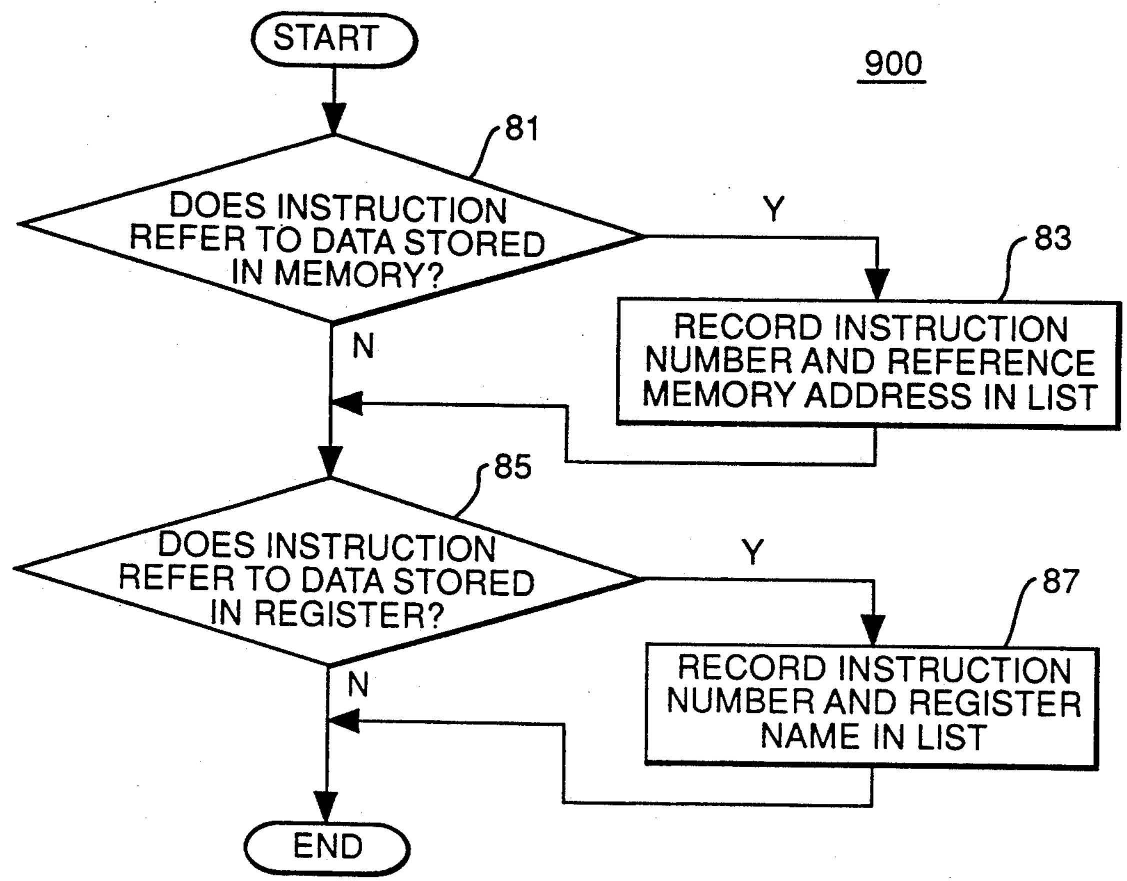
FIG. 9 is a flow diagram of the steps of the resource reference extraction section of the preferred implementation.
FIG. 10 illustrates a resource reference extraction list generated by the steps of the resource reference extraction section of the preferred implementation.

After the loop extraction section 10 of the preferred implementation identifies a loop of instructions in the IC and extracts the loop for processing by the loop compiler section 8, the resource reference extraction section 12 begins processing. FIG. 9 is a flow diagram 900 of the processing steps of the resource reference extraction section 12 of the preferred implementation.

First, the section 12 extracts (or identifies) instructions which refer to (or read) data from memory (step 81). In FIG. 6, for example, instructions (2) and (3) are extracted because "1db" or load is the type of instruction which reads data from memory. Section 12 then records the instruction number and memory address referenced by the instruction in a resource reference extraction list (step 83). In FIG. 6, for example, the memory address for q in register Rq and the memory address for r in register Rr are referenced. Therefore, q+n and r+n are added to the resource reference extraction list; where q and r are memory addresses and n is merely the loop iteration number.

FIG. 10 illustrates an example of a resource reference extraction list 90 generated by the resource reference extraction section 12. The example list 90 therefore includes instructions (2) and (3), and the corresponding resource referenced by each of these instructions, q+n and r+n, respectively.

Next, the section 12 extracts instructions which reference data in registers (step 85). In FIG. 6, for example, instructions (6), (7), and (8) are extracted because "add", "Stb" and "Cmp" are instructions which reference data in registers. The section 12 then records the instruction number and register name referenced by each of the instructions which reference data in registers in the resource reference extraction list (step 87). For example, using the assembly language listing in FIG. 6, Rs and Rt of instruction (6), Ru of instruction (7) and Rp of instruction (8) are added to the resource reference extraction list illustrated in FIG. 10.

Figures 11, 12:
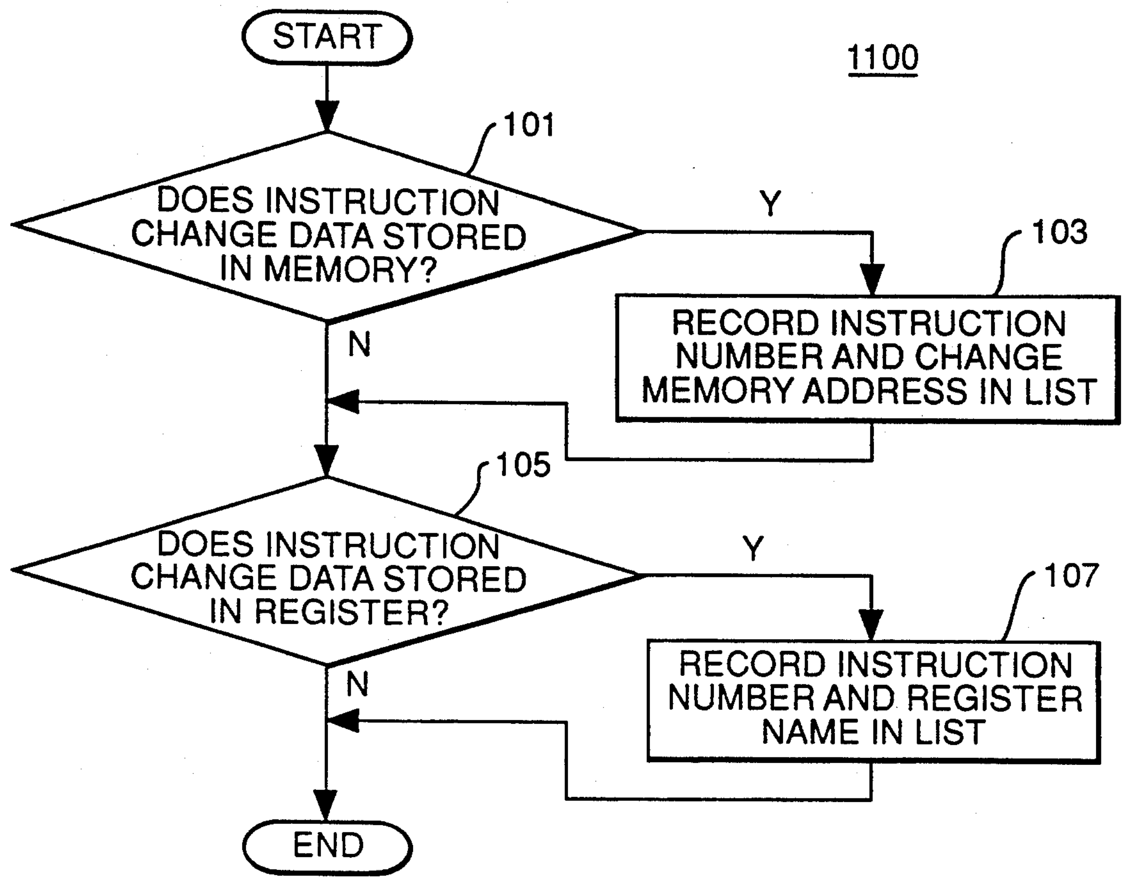
FIG. 11 is a flow diagram of the steps of the resource change extraction section of the preferred implementation.
FIG. 12 illustrates a resource change extraction list generated by the steps of the resource change extraction section of the preferred implementation.

The resource reference extraction section 12 operates simultaneously with the resource change extraction section 14. FIG. 11 is a flow diagram 1100 of the steps performed by the resource change extraction section 14. The section 14 first extracts instructions which change data stored in memory (step 101). Using FIG. 6, for example, instruction (7) is extracted because "Stb" is an instruction which alters data stored in memory. The section 14 then records the instruction number and memory address, which corresponding data is changed by the extracted instruction, in a resource change extraction list (step 103). For example, in FIG. 6, data corresponding to memory address p in register Rp is changed. Therefore, p+n is added to the resource changed extraction list. The p symbolizes the memory address of the data to be changed and the n is for the iteration of the loop.

FIG. 12 is an example of a resource change extraction list 110 generated by the section 14 for the code of FIG. 6. Instruction (7) and the corresponding p+n are in the list 110.

The section 14 then identifies and extracts from the loop of instructions, those instructions that change data stored in registers (step 105). Using FIG. 6, for example, instructions (2), (3) and (6) are extracted. The section 14 then records the instruction number and register name changed by the instruction in the resource change extraction list (step 107). Using FIG. 6, for example, Rs of instruction (2), Rt of instruction (3), and Ru of instruction (6) are added to the resource change extraction list of FIG. 12.

After the resource reference extraction section 12 and the resource change extraction section 14 of the preferred implementation have generated each of their respective lists, the operation of the loop parallel decision section 16 begins. The section 16 generally determines whether different iterations of the input loop can be executed parallely using multiple microprocessors of the type included in the system 100 and determines which stage or instruction parallel execution can begin using the lists generated by the resource reference extraction section 12 and the resource change extraction section 14.

Figure 13A:
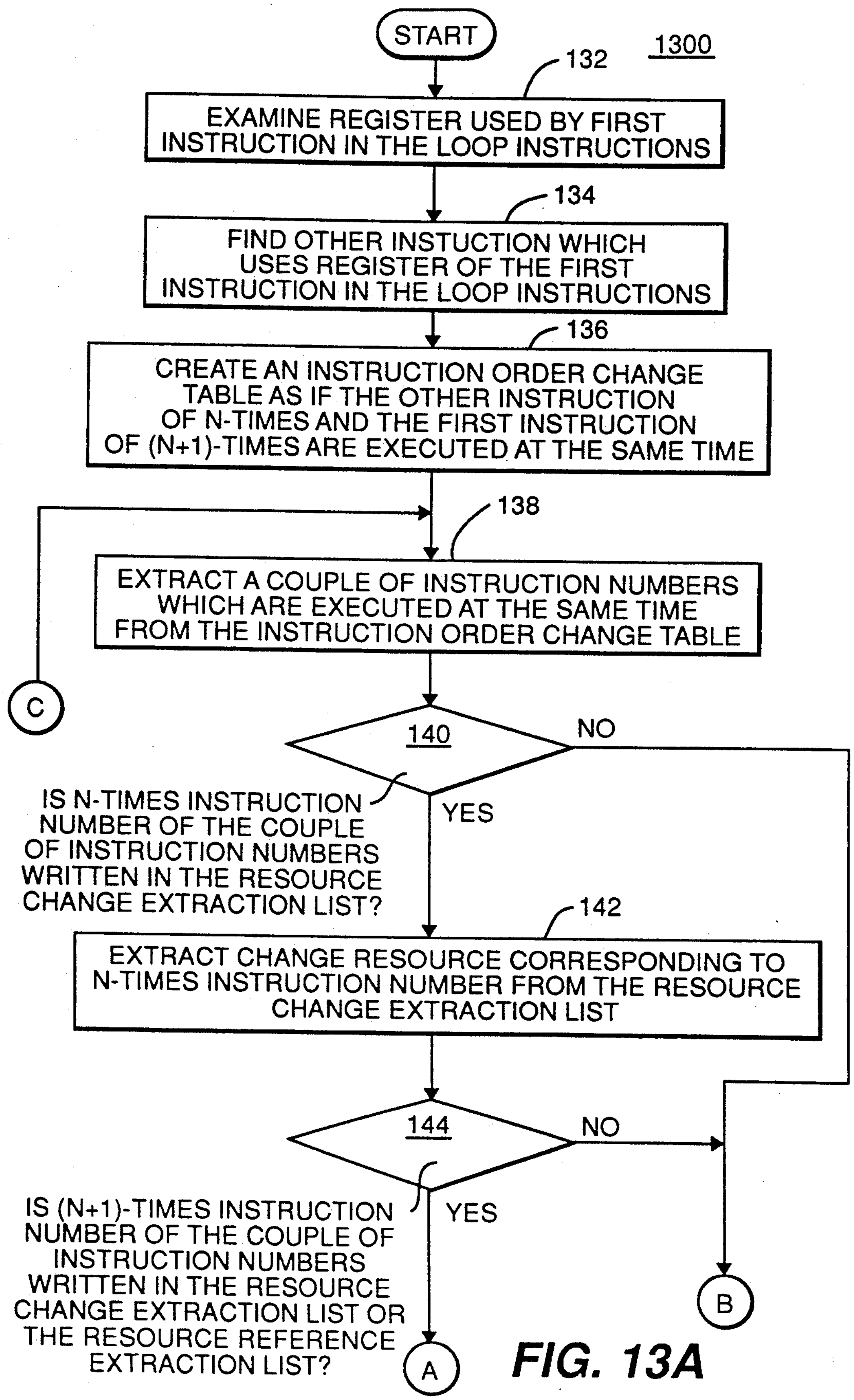
FIGS. 13A, 13B and 13C illustrate a flow diagram of the steps of the loop parallel decision section of the preferred implementation.
Figure 13B:
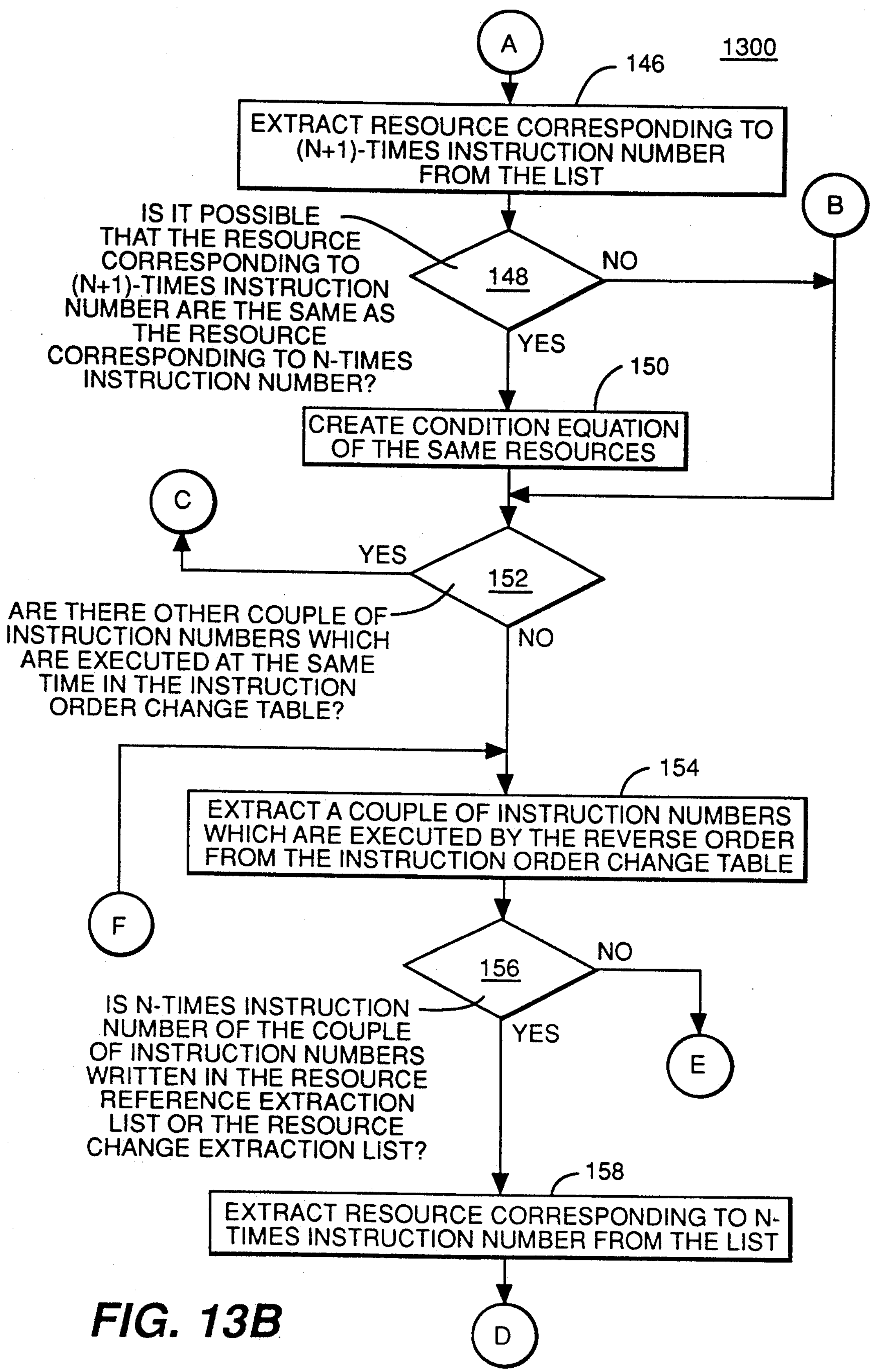
Figure 13C:
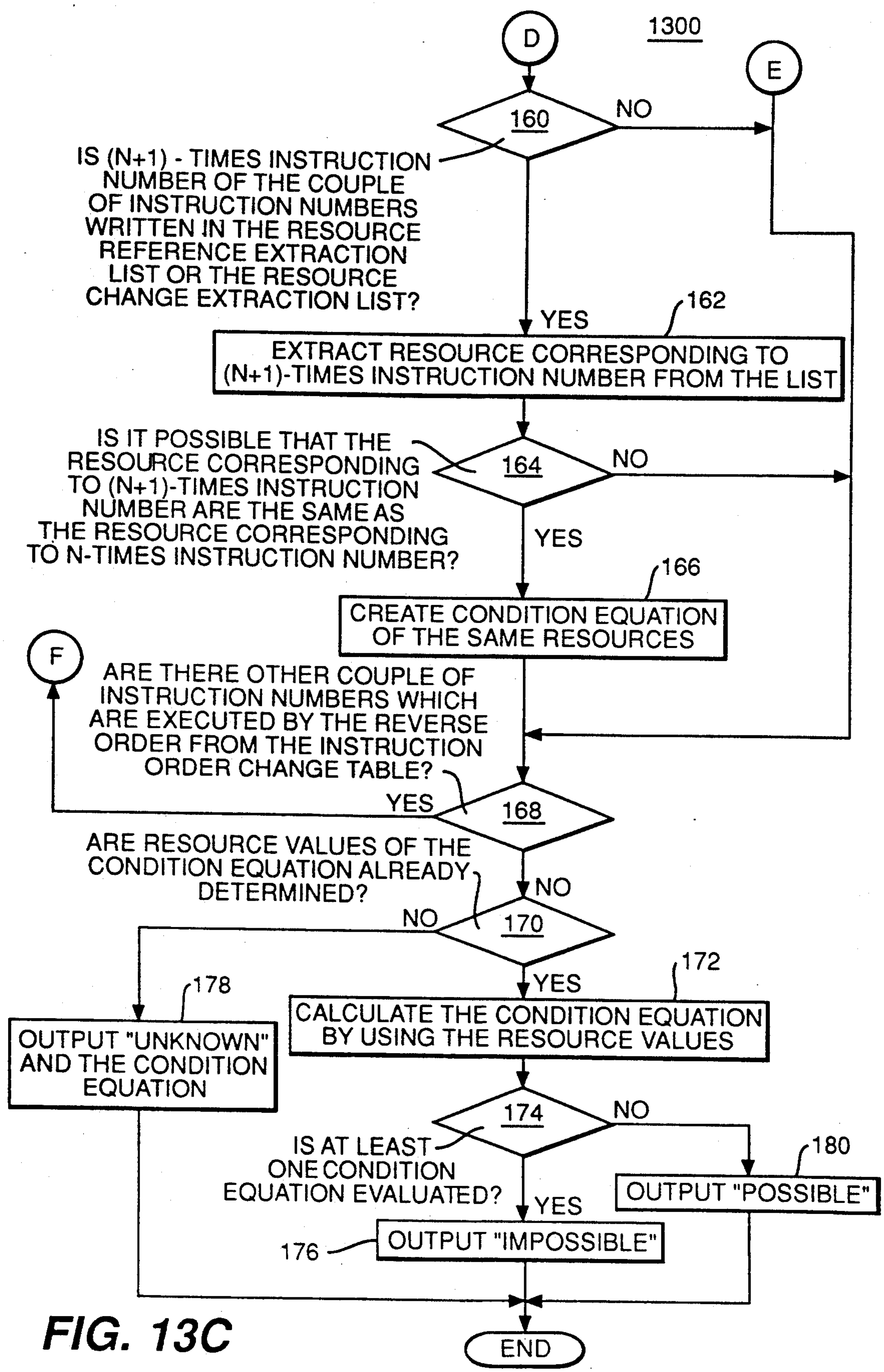

The operations of the loop parallel decision section 16 will now be explained using the resource reference extraction list 90 and the resource change extraction list 110 corresponding to the code of FIG. 6. FIGS. 13A-13C illustrate a flow diagram 1300 of the operations of the loop parallel decision section 16 of the loop compiler section 8 (FIG. 4).

The section 16 first examines or identifies the register used by the first instruction of the loop (step 132), and then locates the next instruction (referred to as the "other instruction") in the loop that uses that same register (step 134). Next, the section 16 creates an instruction order change table indicating that the other instruction of the n-times iteration of the loop is executed simultaneously with the first instruction of the (n+1)-times iteration of the loop.

For example, using the loop of FIG. 6, the loop parallel decision section 16 generates, in step 136, a table of the type illustrated in FIG. 14. In the change order table 200 of FIG. 14, the columns correspond to the n-times iteration of the loop of FIG. 6 and the rows correspond to the (n+1)-times iteration of the loop of FIG. 6. In general, there are two kinds of changes to the instruction order using parallel processing techniques. One type of change is called the reverse order change where, for example, the correct instruction order is: instruction (a) followed by instruction (b) or (a)-(b), and the reverse order or (b)-(a) is executed. The second type of order change is where instruction (a) and (b) are executed at the same time rather than sequentially. In the table 200 of FIG. 14, the triangle "W" is used to indicate that the instructions are executed simultaneously and the circles "0" are used to indicate that the instructions are executed out of order.

For example, the triangle in the column corresponding to instruction (6) in the n-times iteration of the loop of FIG. 6 and the row corresponding to instruction (2) of the (n+1)-times iteration of the loop of FIG. 6 generated by the loop decision parallel section 16 indicates that these instructions (instruction (6) of the n-times iteration and instruction (2) of the (n+1)-times iteration) are executed simultaneously. Likewise, the section 16 also indicates that instruction (7) of the n-times iteration is executed at the same times as instruction (3) of the (n+1)-times iteration; instruction (8) of the n-times iteration is executed at the same times as instruction (4) of the (n+1)-times iteration; and instruction (9) of the n-times iteration is executed at the same times as instruction (5) of the (n+1)-times iteration.

On the other hand, the section 16 also indicates in the table 200, using circles, that instruction 2 of the (n+1)-times iteration is executed before instructions (7), (8) and (9) of the n-times iteration; instruction (3) of the (n+1)-times iteration is executed before instructions (8) and (9) of the n-times iteration; and instruction (4) of the (n+1)-times iteration is executed before instruction (9) of the n-times iteration.

In general, there are three possible problems with changing the order of the instructions of a loop where the instructions involved in the order change use the same resource (memory address or register). First, the instruction which should be executed in advance originally references (or reads) a resource and the instruction which should be executed afterward originally changes (or write) to the same resource. Second, the instruction which should be executed in advance originally changes a resource and the instruction which should be executed afterward originally references the same resource. Third, the instruction which should be executed in advance originally changes the resource and the instruction which should be executed afterward originally changes the same resource. Therefore, as discussed below, the loop parallel decision section 16 examines the entries in the change order table to determine whether one of these problem would occur if the order of instructions is changed.

In the example of FIG. 14, all sets of instructions (the n-times iteration instruction and the (n+1)-times iteration instruction) corresponding to the circle "O" in table 200 face the three change order problems discussed above. All set of instructions corresponding to the triangle, however, only face the second and third change order problems discussed above.

When reference instruction and change instruction are executed at the same time, the reference instruction is executed and then the change instruction is executed. In other words, even if these instructions are executed at the same time, the execution order faces the first change order problem. Therefore, the loop parallel decision section 16 decides whether one of the change order problems would occur with respect to a set of two instructions corresponding to "O" in the change order table, and whether one of second and third change order problems would occur with respect to a set of two instructions corresponding to a triangle in the change order table.

Returning to the flow diagram of FIG. 13A, the section 16 next extracts the instruction numbers for two instructions corresponding to an entry in the change order table which indicates that the two instructions can be executed at the same time (step 138). For example, using table 200 of FIG. 14, the section 16 would extract instruction (2) of the (n+1)-times iteration and instruction (6) of the n-times iteration.

The section 16 then checks the n-times instruction number extracted from the change order table to determine whether that instruction number appears in the resource change extraction list (step 140). If yes, the section 16 extracts the change resource corresponding to the n-times instruction number from the resource change extraction list (step 142). Then, the section 16 determines whether the (n+1)-times instruction number of the instructions extracted from the change order table is written in the resource change extraction list or the resource reference extraction list (step 144).

If the (n+1)-times instruction number is in either of the lists (step 144), the flow of operation of the section 16 continues in FIG. 13B with step 146. In step 146, the section 16 extracts resource corresponding to the (n+1)-times instruction number from the list. The section 16 then determines whether the resource corresponding to the (n+1)-times instruction number is the same as the resource corresponding to the n-times instruction number (step 148). If yes, then the section 16 creates a condition equation indicating this result (step 150). The condition equation will be discussed below with reference to FIG. 15.

Otherwise (step 148), or if the n-times instruction number of the instruction numbers extracted from the change order table is not in the resource change extraction list (step 140 of FIG. 13A), or if the (n+1)-times instruction number is not in either of the resource change extraction list or the resource reference extraction list (step 144 of FIG. 13A), or after having created the condition equation (step 150), the section 16 determines whether there are any more entries in the change order table indicating the two instructions can be executed at the same time (step 152). If yes, then the flow of operation for the section 16 returns to step 138 of FIG. 13A.

Otherwise, there are no more entries in the change order table indicating that two instructions can be executed at the same time (step 152), and the section 16 extracts from the change order table, the first set of instructions (for the n-times iteration and the (n+1)-times iteration) indicating that the instruction, if simultaneously executed by multiple processors, would be in reverse order (step 154).

The loop parallel decision section 16 then examines the extracted instruction numbers to determine whether the n-times instruction number is in either the resource reference extraction list or the resource change extraction list (step 156). If yes, then the section extracts the name of the resource corresponding to the n-times instruction from the list in which the instruction number was found (step 158).

The flow of operation of the section 16 then continues on FIG. 13C. The loop parallel decision section 16 next determines whether the (n+1)-times instruction of the instructions extracted from the change order table is in either of the resource reference extraction list or the resource change extraction list (step 160). If yes, then the section 16 extracts the name of the resource corresponding to the (n+1)-times instruction from the list in which the instruction number was found (step 162).

Next, the section 16 decides whether the resource corresponding to the n-times instruction and the resource corresponding to the (n+1)-times instruction are the same (step 164). If yes, then the section 16 creates a condition equation using these resources (step 166).

Otherwise (step 164), or if the n-times instruction number of the instructions extracted from the change order table is not in either of the resource reference extraction list or the resource change extraction list (step 156), or if the (n+1)-times instruction number of the instructions extracted from the change order table is not in either of the resource reference extraction list or the resource change extraction list (step 160), then the section 16 determines whether there are any other sets of instructions in the change order table wherein the table indicates that these instruction may be executed out of the original order (step 168). If yes, then the flow of operation of the loop parallel decision section returns to step 154 of FIG. 13B.

Returning to the example of change order table 200 of FIG. 14 and the instructions of FIG. 6, the loop parallel decision section 16 would first extract the sets of instructions corresponding to the triangles in the table 200:

(A) As for the n-times instruction (6) and the (n+1)-times instruction (2), the instruction (6) changes register Ru and the instruction (2) changes register Rs. These registers are different from each other. Therefore, this case is no problem.

(B) As for the n-times instruction (7) and the (n+1)-times instruction (3), the instruction (7) changes memory address p+n and the instruction (3) references memory address r+n. If p=r+1, these memory address are the same. Therefore, this case is a problem.

(C) As for the n-times instruction (8) and the (n+1)-times instruction (4), the instruction (8) does not change a register or memory address. Therefore, this case is no problem.

(D) As for the n-times instruction (9) and the (n+1)-times instruction (5), the instruction (9) does not change register or memory address. Therefore, this case is no problem.

Next, the section 16 would analyze the sets of instructions corresponding to circle "0" in the change order table as follows:

(E) As for the n-times instruction (7) and the (n+1)-times instruction (2), the instruction (7) references register Ru and changes memory address p+n. The instruction (2) references memory address q+n and changes register Rs. Two registers Ru and Rs are different. These registers do not create a problem. If however p=q+1, these memory addresses are same. This case would create a problem.

(F) As for the n-times instruction (8) and the (n+1)-times instruction (2), the instruction (8) references register Rp. The instruction (2) changes register Rs. These registers are different. Therefore, this case is no problem.

(G) As for the n-times instruction (8) and the (n+1)-times instruction (3), the instruction (8) references register Rp. The instruction (3) changes register Rt. These registers are different. Therefore, this case is no problem.

(H) As for the n-times instruction (9) and the (n+1)-times instruction (2), the instruction (9) does not refer and change. Therefore, this case is no problem.

(I) As for the n-times instruction (9) and the (n+1)-times instruction (3), the instruction (9) does not refer and change. Therefore, this case is no problem.

(J) As for the n-times instruction (9) and the (n+1)-times instruction (3), the instruction (9) does not refer and change. Therefore, this case is no problem.

As a result of the analysis by the section 16, problem cases (B) and (E) are identified.

After identifying the problem cases, the loop parallel decision section 16 creates a list of the sets of instructions which create problems or where the use of the same resources may create execution problems. This list consists of the condition equations discussed above. FIG. 15 is an example of a list of condition equations created by the section 16 for the table 200 of FIG. 14.

Returning again to FIG. 13C, if there are no more order change entries (step 168), then the section 16 begins evaluation of the condition equations generated by steps 150 and 166. In evaluating the condition equations, the section 16 first determines whether the values for the resources in the condition equation are already determined (step 170). That is, whether the values for the resources can be predetermined during the compiling of the loop. If yes, then the condition equation is calculated using the predetermined values for the resources (step 172). If no condition equation can be evaluated (step 174), then the section 16 outputs "possible." If at least one condition equation can be evaluated (step 174), then the section 16 outputs "impossible."

Otherwise, if the values for the resources of the condition equation are not already determined, but these values can only be determined during execution of the loop of instructions being compiled (step 170), then the section 16 outputs "unknown" (step 178).

In problem cases (B) and (E), discussed above with reference to FIG. 14, the change of execution order for a set of instructions creates a problem because two memory addresses (resources) are same. For example, in FIG. 15, the following equations are generated:

$$(\textit{initial value of "p"}) = (\textit{initial value of "q"}) + 1 \quad (3)$$

$$(\textit{initial value of "p"}) = (\textit{initial value of "r"}) + 1 \quad (4)$$

If equation (3) is generated, the execution order of the n-times instruction (7) and the (n+1)-times instruction (2) must not be changed. If equation (4) is generated, the n-times instruction (7) and the (n+1)-times instruction (3) must not be executed at the same time.

For example, if initial values of "p", "q", "r" are predetermined, the loop parallel decision section 16 can decide whether the above equations (3) and (4) can be evaluated. If at least one of these equations can be evaluated, the loop parallel decision section 16 outputs "impossible" to the code generation section 18. If both equations (3) and (4) cannot be evaluated, the loop parallel decision section 16 outputs "possible" to the code generation section 18. However, if initial value of "p", "q" and "r" are not predetermined, the loop parallel decision section 16 cannot decide whether the above equations (3) and (4) can be evaluated. Therefore, the loop parallel decision section 16 supplies "unknown" to the code generation section 18.

Figure 16:
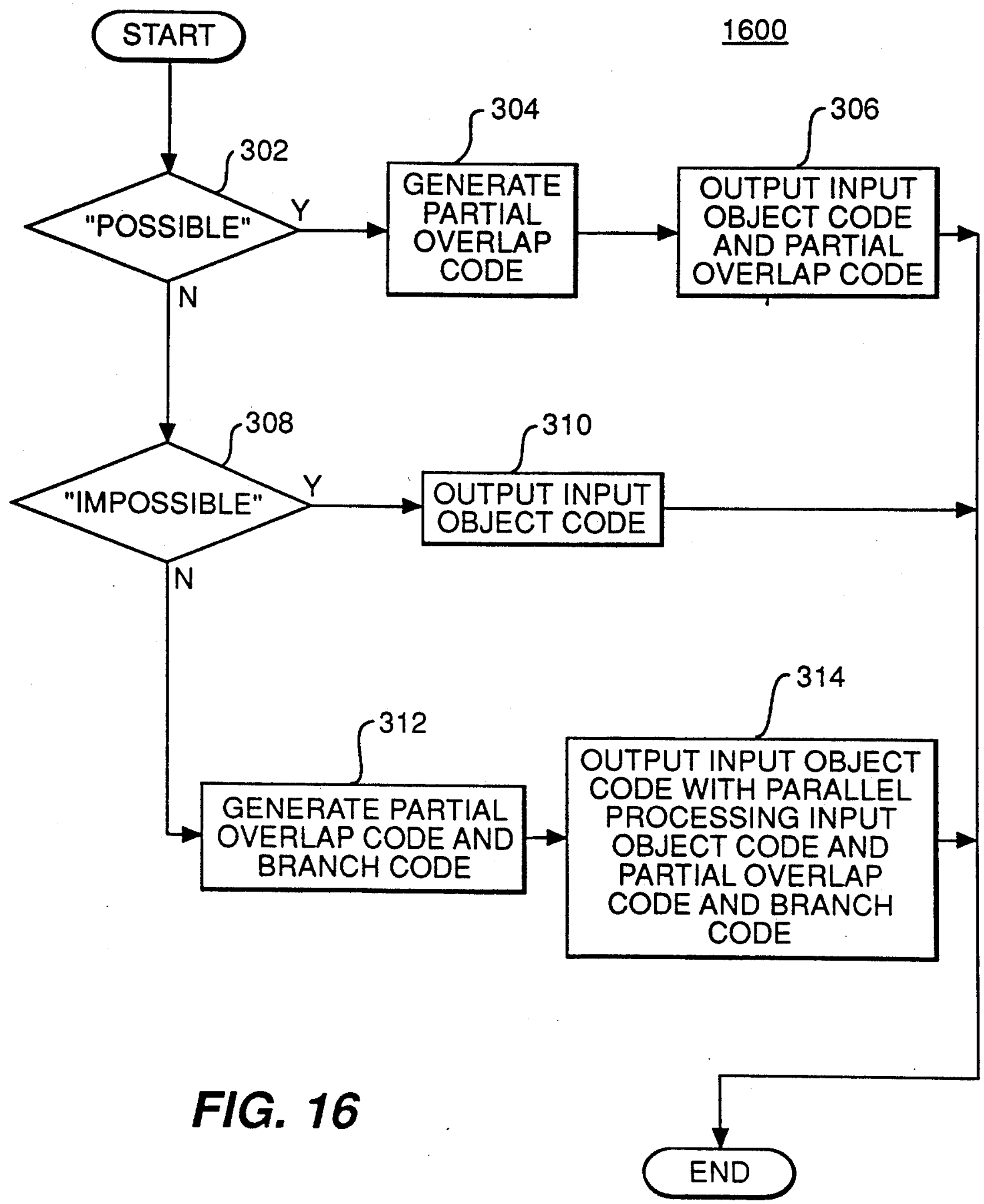
FIG. 16 is a flow diagram of the steps of the code generation section of the preferred implementation.

FIG. 16 illustrates a flow diagram 1600 of the code generation section 18 of the preferred implementation. As discussed above, the loop parallel decision section 16 outputs "possible," "impossible," or "unknown." If the code generation section 18 receives "possible" from the section 16 (step 302), the code generation section 18 generates a partial overlap object code corresponding to the instructions of the loop that may be parallely executed (step 304) and outputs the input object code and the partial overlap code as the output code OC of FIG. 4 (step 306).

Figure 17:
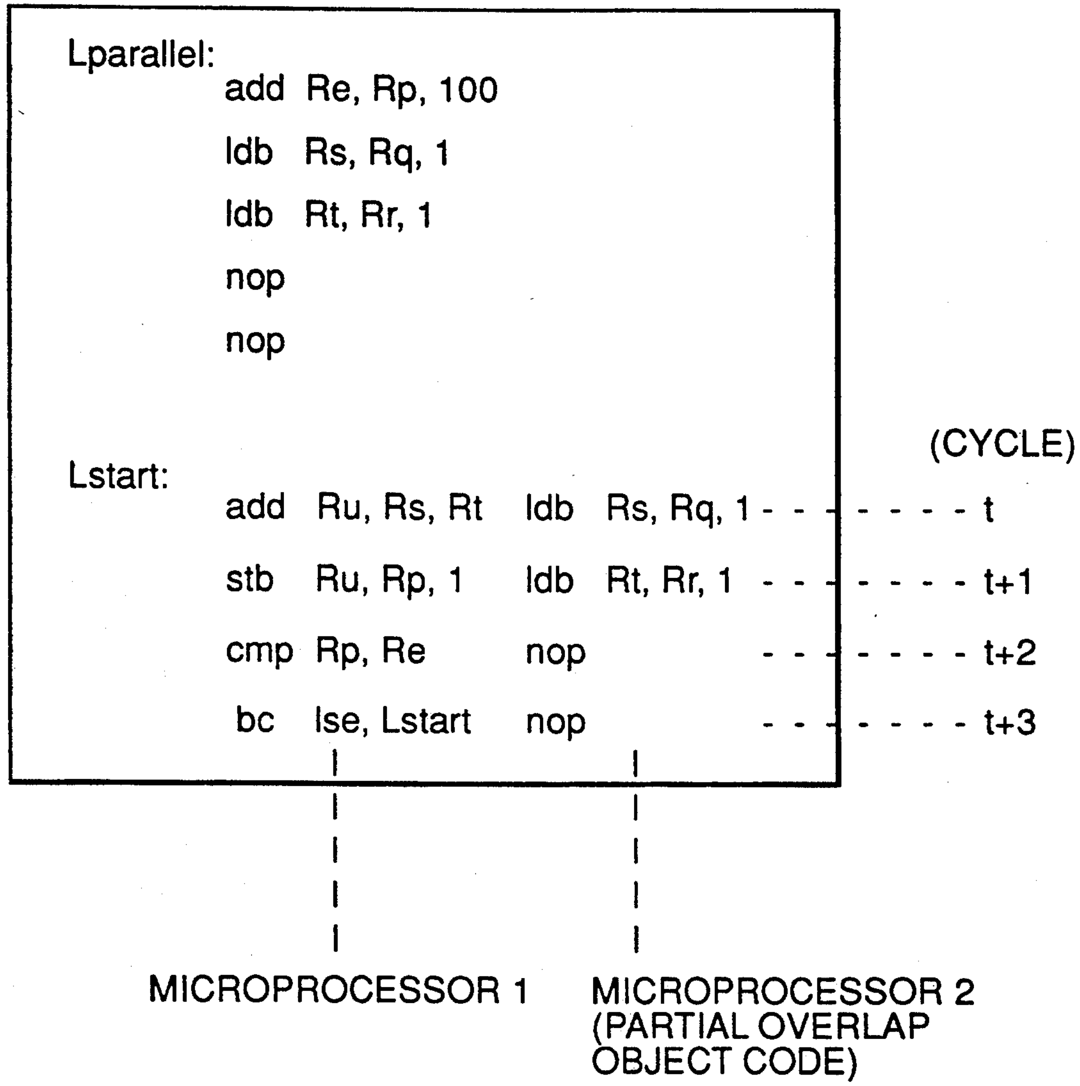
FIG. 17 illustrates an example of the assembly language instructions corresponding to the object code instructions generated by the code generation section of the preferred implementation for the loop of FIG. 5, which instructions are capable of being parallely executed.

For example, in FIG. 17, the instructions identified as being executed in microprocessor 2 is the overlap object code generated by the code generation section 18 corresponding to the code of FIG. 6. In FIG. 17, the following sets of instructions are executed at the same time:

In cycle t: the n-times instruction (6) and the (n+1)-times instruction (2).

In cycle (t+1): the n-times instruction (7) and the (n+1)-times instruction (3).

In cycle (t+2): the n-times instruction (8) and the (n+1)-times instruction (4).

In cycle (t+3): the n-times instruction (9) and the (n+1)-times instruction (5).

When the code generation section 18 receives "impossible" from the loop parallel decision section 16 (step 308), the code generation section 18 outputs as OC of FIG. 4 the input object code which is sequentially executed. The OC in this case is the same object code input to the loop compiler section 8, and is the object code corresponding to the assembly language code illustrated in FIG. 6 (step 310).

Otherwise, if the code generation section 18 receives "unknown" from the loop parallel decision section 16 indicating that no definitive decision can be made during compile time as to whether the loop can be parallely executed (step 308), the code generation section 18 generates object instructions which branches to a parallel execution instruction set or to a non-parallel execution instruction set, according to the condition at execution mode. The section 18 also generates the partial overlap code discussed above for the input object code (step 312) and outputs object code including: (1) the branching code; (2) the input object code for the loop to be used during execution if the iterations of loop are to be executed sequentially by a single processor; and (3) the input object code and partial overlap code to be used during execution if the iterations of the loop are to be parallely executed (step 314).

In FIG. 18, an example of the object code corresponding to the code of FIG. 6 output if "unknown" is received by the section 18, instructions (10), (11), (12) and (13) are the condition of parallel execution at execution time. During execution, the following conditions are evaluated:

(*initial value of* "*p*") = (*initial value of* "*q*") + 1

(*initial value of* "*p*") = (*initial value of* "*r*") + 1

In this case, during the execution process of the former program, values of "p", "q", "r" are determined. Therefore, it is possible to determine whether the above-mentioned equations can be solved, or not, just before the loop instructions are executed. If at least one of the above-mentioned equations is solved, the original instructions "Lseq" which are non-parallel execution instructions are executed. If both of the above-mentioned equations are not solved, object instructions "Lparallel" which are parallel execution instructions are executed.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. A loop compiler in a data processing system comprised of a plurality of processors, each capable of executing object programs, wherein the loop compiler compiles an object program consisting of a plurality of instructions to be executed by the data processing system, wherein a loop consists of a plurality of instructions to be executed a plurality of iterations by a one of the plurality of processors, the loop compiler comprising:

loop instructions extraction means for extracting a loop from the plurality of instructions;

resource reference extraction means for extracting resources read by at least one of the instructions in the extracted loop;

resource change extraction means for extracting resources changed by at least one of the instructions in the extracted loop;

loop parallel decision means for determining, in accordance with the extracted resources extracted by the resource reference extraction means and the resource change extraction means, whether it is impossible, possible or unknown if a first iteration and a second iteration of the loop can be parallely executed; and code generation means for generating, in accordance with the determination of the loop parallel decision means, object instructions, including at least one of a plurality of types of object instructions for the object program wherein the following types correspond, respectively, to the determination of possible, impossible or unknown a first type wherein the object instructions are parallely executed by the plurality of processors, a second type wherein the object instructions are executed by a one of the plurality of processors, and a third type wherein the object instructions include branch parallel execution instructions, non-parallel execution instructions and parallel execution instructions, wherein the branch parallel execution instructions are used, during execution of the object program, to determine whether the non-parallel execution instructions are to be executed by a one of the parallel processors or the parallel execution instructions are to be executed by the plurality of processors.

2. The loop compiler according to claim 1, wherein the resources extracted include a register, wherein data corresponding to the register is read or changed, and a memory address, wherein data corresponding to the memory address is read or changed.

3. The loop compiler apparatus according to claim 2, wherein each of the plurality of object instructions includes an instruction number, wherein the resource reference extraction means includes:

a first means for extracting from the loop a first object instruction reading data corresponding to the memory address, a second means for extracting from the loop a second object instruction reading data stored in the register, and means for recording a plurality of instruction numbers including, a first instruction number corresponding to the first object instruction and a second instruction number corresponding to the second object instruction.

4. The loop compiler according to claim 2, wherein each of the plurality of object instructions includes an instruction number, wherein the resource change extraction means includes:

a first means for extracting a first object instruction changing data corresponding to memory address, a second means for extracting a second object instruction changing data stored in the register, and means for recording a plurality of instruction numbers including, a first instruction number corresponding to the first object instruction extracted by the first means for extracting an object instruction and a second instruction number corresponding to the second object instruction extracted by the second means for extracting an object instruction.

5. The loop compiler according to claim 1, wherein the loop parallel decision means includes:

means for identifying which of the plurality of instructions whose execution order can be changed, and means for extracting same resource which is read or changed by at least two instructions whose execution order is different from the original order of the loop instructions, according to the extraction result of the resource reference extraction means and the resource change extraction means.

6. The loop compiler according to claim 5, wherein the code generation means includes means for generating condition instructions to branch parallel execution instructions or non-parallel execution instructions, which are added to head of the parallel execution instructions and the non-parallel execution instructions, according to the same resource extracted by the loop parallel decision means.

7. In a data processing system including a plurality of microprocessors for parallel execution of a program including a plurality of object instructions, wherein loops consist of a plurality of the object instructions capable of being executed by one of the plurality of microprocessors a plurality of times, the method performed in the data processing system consisting of the steps:

identifying a loop in the program;

determining whether it is impossible, possible or unknown if a first iteration and a second iteration of the loop can be parallelly executed; and generating, in accordance with a possible or unknown determination, and adding to the program a plurality of new object instructions including a branch object instruction and parallel processing instructions, wherein the parallel processing instructions are comprised of at least one of the object instructions corresponding to the loop, and wherein the branch object instruction is used, during execution of the object program, to determine whether non-parallel execution instructions are to be executed by a one of the parallel microprocessors or the parallel processing instructions are to be executed by the plurality of microprocessors.

8. The method of claim 7 wherein the data processing system includes a plurality of memory identifiers, and wherein the data processing system performs a plurality of operations corresponding to the object instructions of the program including a read operation which reads data corresponding to a memory identifier and a change operation which changes data corresponding to a memory identifier, wherein each of the object instructions of the program includes an object instruction identifier and an identifier for a memory identifier, and wherein the determining step includes the steps of:

extracting from a first object instruction of the program, which instructs the data processing system to perform the read operation, the object instruction identifier and the identifier for a memory identifier;

extracting from a second object instruction of the program, which instructs the data processing system to perform the change operation, the object instruction identifier and the identifier for a memory identifier; and deciding, using the object instruction identifier and the identifier for a memory identifier corresponding to the first object instruction, which instructs the data processing system to perform the read operation, and using the object identifier and the identifier for a memory identifier corresponding to the second object instruction, which instructs the data processing system to perform the change operation, whether the first object instruction, which instructs the data processing system to perform the read operation, can be executed by the data processing system simultaneously with the second object instruction, which instructs the data processing system to perform the change operation.

9. The method of claim 8 wherein the memory identifier corresponding to the first object instruction, which instructs the data processing system to perform the read operation identifies the same memory identifier of the data processing system as the memory identifier corresponding to the second object instruction, which instructs the data processing system to perform the change operation.

10. The method of claim 7 wherein the branch object instruction includes a condition for instructing the data processing system to execute the parallel processing instructions.

* * * * *

UNITED STATES PATENT AND TRADEMARK OFFICE
CERTIFICATE OF CORRECTION

PATENT NO. : 5,317,743

DATED : May 31, 1994

INVENTOR(S) : Toru Imai et al.

It is certified that error appears in the above-identified patent and that said Letters Patent is hereby corrected as shown below:

Claim 1, Column 16, Line 9, after "unknown" insert a semicolon (;).

Claim 2, Column 16, Line 26, change "resources extracted" to --extracted resources--.

Signed and Sealed this

Twenty-first Day of February, 1995

Attest:

BRUCE LEHMAN

Attesting Officer

Commissioner of Patents and Trademarks